(12) United States Patent
Huang et al.

(10) Patent No.: US 11,745,252 B2
(45) Date of Patent: Sep. 5, 2023

(54) METHOD OF PRODUCING A MAGNESIUM ALLOY WHEEL HUB

(71) Applicant: CITIC Dicastal Co., Ltd., Qinhuangdao (CN)

(72) Inventors: Lixin Huang, Qinhuangdao (CN); Zuo Xu, Qinhuangdao (CN); Decai Kong, Qinhuangdao (CN); Jingru Shen, Qinhuangdao (CN); Meng Li, Qinhuangdao (CN); Tieqiang Chen, Qinhuangdao (CN); Qingzhu Zhang, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 0 days.

(21) Appl. No.: 17/576,220

(22) Filed: Jan. 14, 2022

(65) Prior Publication Data
US 2022/0410252 A1 Dec. 29, 2022

(30) Foreign Application Priority Data
Jun. 29, 2021 (CN) .......................... 202110723588.3

(51) Int. Cl.
*B21K 1/40* (2006.01)
*B21J 1/06* (2006.01)

(52) U.S. Cl.
CPC .. *B21K 1/40* (2013.01); *B21J 1/06* (2013.01)

(58) Field of Classification Search
CPC ........ B21K 1/40; B60B 2310/208; B21J 1/06; B21J 5/008
See application file for complete search history.

(56) References Cited

U.S. PATENT DOCUMENTS

| 7,523,635 B2 * | 4/2009 | Ono | B60B 3/06 72/356 |
| 10,646,914 B2 * | 5/2020 | Nanninga | B21D 53/30 |

FOREIGN PATENT DOCUMENTS

| CN | 105014321 A | 11/2015 |
| CN | 105665610 A | 6/2016 |

(Continued)

OTHER PUBLICATIONS

Machine Translation of CN 107363474 A (Year: 2007).*

*Primary Examiner* — Christopher J Besler
(74) *Attorney, Agent, or Firm* — IPRO, PLLC

(57) ABSTRACT

The disclosure discloses a method of producing a magnesium alloy wheel hub, comprises the following steps: step 1, heating a magnesium alloy bar to 350-430° C. and keeping the temperature for 20 minutes; step 2, initially forging and forming the bar under a forging press, the forging speed is 6-15 mm/s; step 3, finally forging and forming the bar under a forging press, and the forging speed is 5-8 mm/s; step 4, testing the microstructure and material properties of the final forged blank to obtain the layered material property distribution on the thickness of the blank; step 5, according to the layered material property distribution on the thickness of the blank obtained in step 4, selecting the part that meets the requirements to make a magnesium alloy wheel hub. According to the different properties in the thickness direction of the blank, the spoke orientation of the magnesium alloy wheel can be quickly designed according to the needs, and the magnesium alloy wheel that meets the usage performance can be obtained, which greatly improves the design and processing efficiency.

9 Claims, 4 Drawing Sheets

(56) References Cited

FOREIGN PATENT DOCUMENTS

| | | |
|---|---|---|
| CN | 107363474 A | 11/2017 |
| CN | 110508737 A | 11/2019 |
| CN | 111745121 A | 10/2020 |
| JP | 2007291488 A | 11/2007 |

* cited by examiner

METHOD OF PRODUCING A MAGNESIUM ALLOY WHEEL HUB

TECHNICAL FIELD

The disclosure relates to the technical field of wheels, in particular to a method of producing a magnesium alloy wheel hub.

BACKGROUND

Magnesium alloy is a magnesium-based alloy with other elements added. It has features of low density, high specific intensity, large specific elastic modulus, good heat dissipation, good shock absorption, better ability to withstand impact load than aluminum alloy, and resistance to organics and alkali corrosion and other characteristics. It is the lightest metal in practical metals. The specific gravity of magnesium is about ⅔ of that of aluminum and ¼ of that of iron. Therefore, it is widely used in automobile, aviation and aerospace fields, especially in the automotive field, for example, parts made of magnesium alloy can achieve the purpose of lighten the cars. Nowadays, the lightweight requirements of automobiles are getting higher and higher, and the application of aluminum alloys has encountered a bottleneck in the weight reduction effect of automobiles, and the application of magnesium alloys in automobiles is imperative. In recent years, the automotive industry has developed rapidly and has undergone tremendous changes. Countries around the world have introduced time nodes for banning the sale of fuel vehicles. The large-scale application of electric vehicles has brought opportunities for the development of magnesium alloy auto parts.

Magnesium alloy wheels have won the favor of more and more users for their beautiful appearance, safety and comfort. Due to the light weight and high producing precision of the magnesium alloy wheel hub, the deformation is small and the inertial resistance is also small during high-speed rotation. Magnesium alloy wheels have metal characteristics that absorb vibration and rebound force. They are processed by CNC machine tools with high dimensional accuracy, high roundness, small yaw runout, and good balance, which make the car run smoothly and comfortably.

At present, the method of producing magnesium alloy wheels is usually carried out by forging process. It is well known that the properties of forged materials are closely related to the forging process and sequence. Different forging processes and sequences will cause significant differences in the performance of the same place. In the process of forging magnesium alloy, the choice of forging process and sequence will have an important impact on the performance of forged magnesium alloy wheels.

SUMMARY

In view of this, the present disclosure aims to propose a method for producing a magnesium alloy wheel hub, which can obtain a magnesium alloy wheel hub with excellent mechanical properties.

In order to achieve the above objective, the technical solution of the present disclosure is achieved as follows:

A method of producing a magnesium alloy wheel hub comprises the following steps:

Step 1, heating the magnesium alloy bar to 350-430° C., keeping for 20 minutes;

Step 2, initially forging the bar under a 6000-ton forging press, the forging speed is 6-15 mm/s;

Step 3, finally forging the bar under a 6000-ton forging press, and the forging speed is 5-8 mm/s;

Step 4, testing the microstructure and material properties of the final forged blank to obtain the layered material property distribution on the thickness of the blank;

Step 5, according to the layered material property distribution on the thickness of the blank obtained in step 4, selecting the part that meets the requirements to make a magnesium alloy wheel hub.

In some embodiments, in step 5, a magnesium alloy wheel hub is manufactured by machining and cutting away the parts that do not meet the requirements in the thickness direction.

In some embodiments, in step 1, the magnesium alloy bar is first cut into a certain length by a cutting machine, and then heated.

In some embodiments, the magnesium alloy bar in step 1 is heated by a heating furnace.

In some embodiments, the heating furnace comprises an electromagnetic heating furnace.

In some embodiments, the heating temperature in step 1 is 360-420° C.

In some embodiments, the heating temperature in step 1 is 400° C.

In some embodiments, performing the structural test on the final blank in step 4 comprises using a metallurgical microscope and an electron microscope to analyze the microstructure of the forged material.

In some embodiments, performing the material performance test on the final blank in step 4 comprises using a tensile testing machine and a hardness tester to analyze the material performance of the forged material.

The method of producing the magnesium alloy wheel hub of the present disclosure has the following advantages:

The disclosure heats the magnesium alloy bar to a preset temperature, the magnesium alloy bar is more easily deformed and is not easy to produce forging cracks; the blank obtained by the forging process through the initial forging and the final forging can obtain different microstructures and different material mechanical properties in thickness; according to the different properties of the blank, the spoke orientation of the magnesium alloy wheel can be quickly designed according to the needs, and the magnesium alloy wheel that meets the performance can be obtained, which greatly improves the design and processing efficiency.

In addition, the designed and processed wheel hub still has excellent mechanical properties, meeting the American wheel standards (SAE J175 and SAE J328-2005), that is, 13-degree impact strength, radial fatigue, and bending fatigue performance requirements. It can also meet requirements of the wheel strength and fatigue of the national standards (GB/T 5334-2005 and GB/T 15704-1995).

BRIEF DESCRIPTION OF FIGURES

The drawings constituting a part of the present disclosure are used to provide a further understanding of the present disclosure, and the schematic embodiments and descriptions of the present disclosure are used to explain the present disclosure, and do not constitute an improper limitation of the present disclosure. In the attached drawings.

DETAILED DESCRIPTION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The technical solutions of the present disclosure will be clearly and completely described below with reference to the drawings and in conjunction with the embodiments. Obviously, the described embodiments are only a part of the embodiments of the present disclosure, rather than all the embodiments. Based on the embodiments of the present disclosure, all other embodiments obtained by those ordinary skilled in the art without creative work shall fall within the protection scope of the present disclosure.

The method of producing a magnesium alloy wheel hub according to the embodiment of the present disclosure will be described below with reference to FIGS. 1 to 10 in conjunction with the embodiments.

Figure 3:
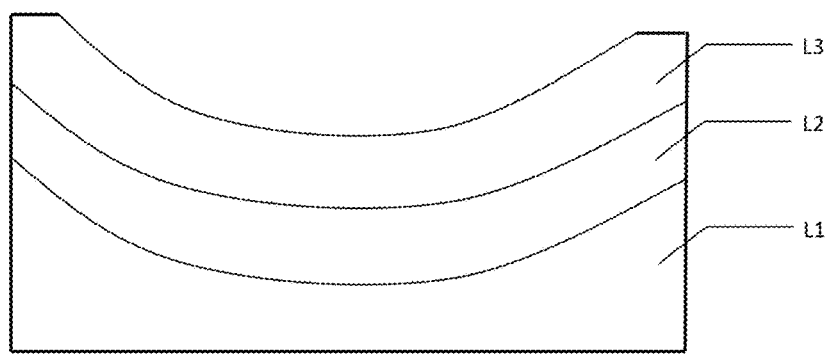
FIG. 3 is a layered view in the thickness direction after final forging of the method for producing a magnesium alloy wheel hub according to the present disclosure.
Figure 4:
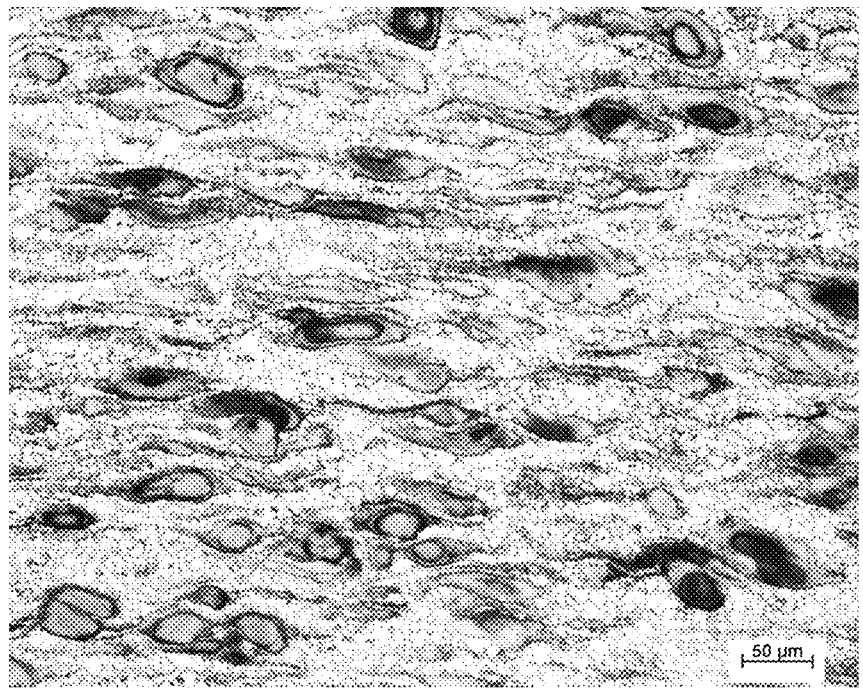
FIG. 4 is a 200-fold metallographic structure of the L1 layer after final forging of the method for producing a magnesium alloy wheel hub according to the present disclosure.
Figure 5:
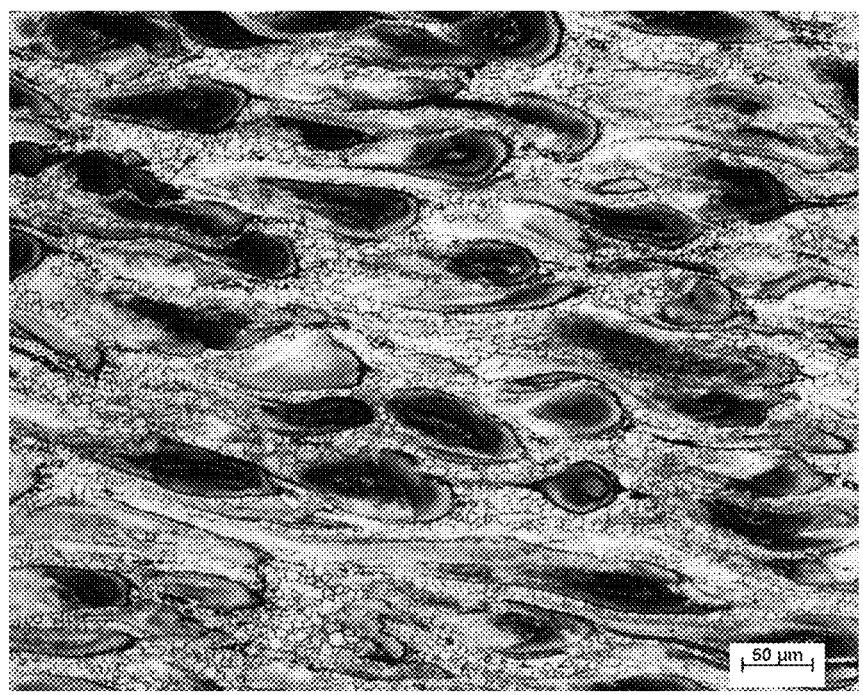
FIG. 5 is a 200-fold metallographic structure of the L2 layer after final forging of the method for producing a magnesium alloy wheel hub according to the present disclosure.
Figure 6:
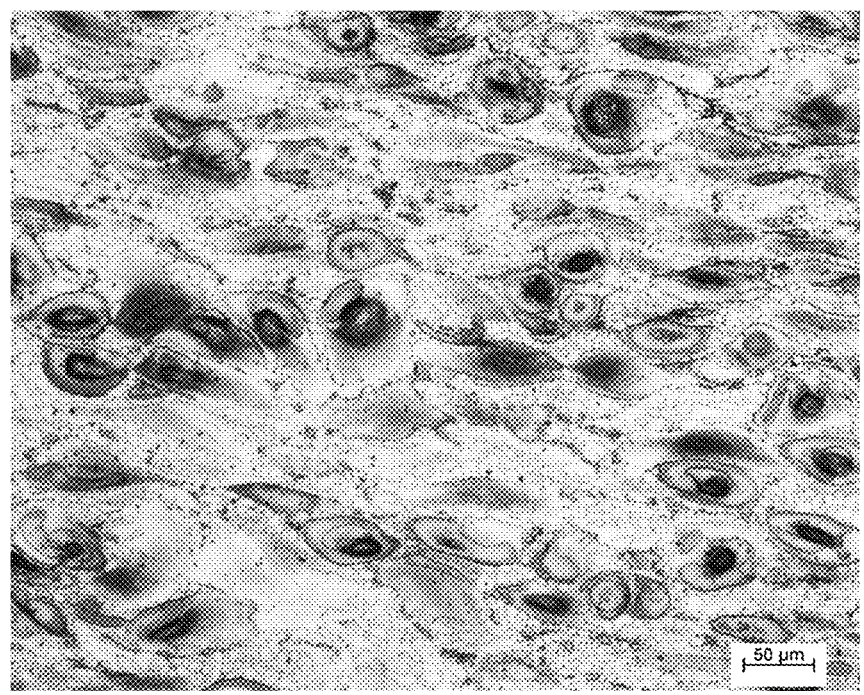
FIG. 6 is a 200-fold metallographic structure of the L3 layer after final forging of the method for producing a magnesium alloy wheel hub according to the present disclosure.
Figure 7:
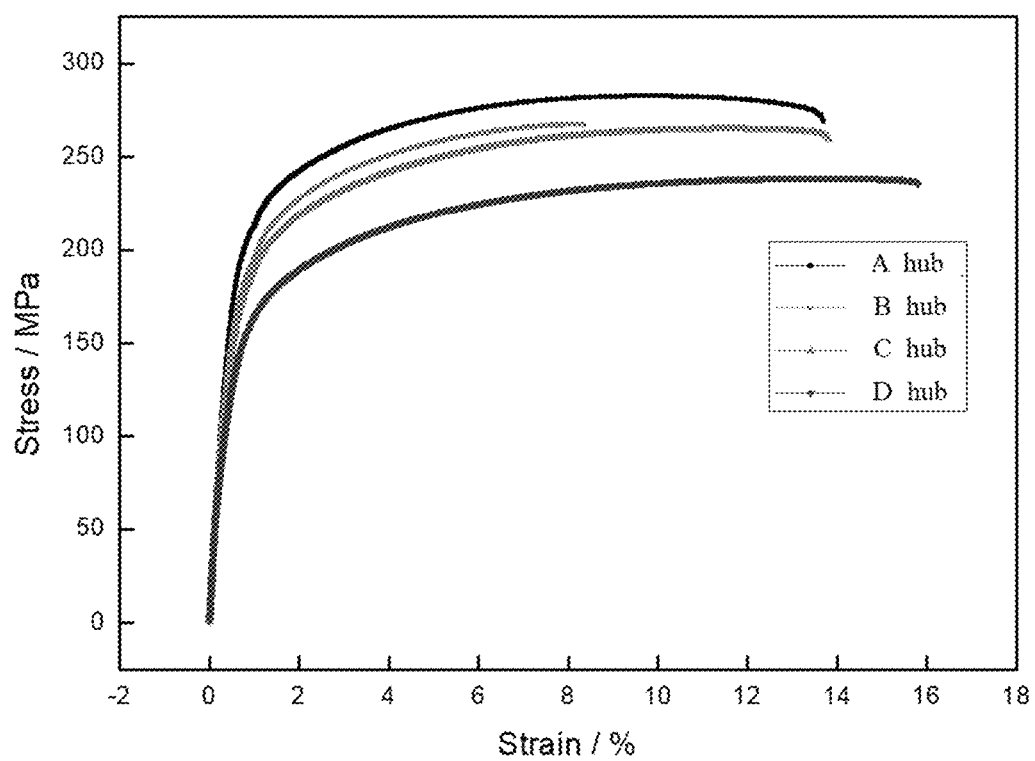
FIG. 7 is a diagram showing the property distribution of material structure in the thickness direction of the method for producing a magnesium alloy wheel hub according to the present disclosure.

A method for producing a magnesium alloy wheel hub comprises the following steps:

Step 1, selecting the most suitable and economical bar length by calculating the material length and material ratio of each magnesium alloy wheel hub in advance, and cutting the magnesium alloy bar to meet the length required by the wheel hub manufacturing; in the heating furnace, heating the magnesium alloy bar to 350-430° C., and keeping the temperature for 20 minutes;

Step 2, initially forging the bar under a 6000-ton forging press, the forging speed is 6-15 mm/s, and the initial forged blank is obtained;

Step 3, finally forging the bar under a 6000-ton forging press, and the forging speed is 5-8 mm/s, and the final forged blank is obtained;

Step 4, testing the structure and material properties of the final forging blank to obtain the layered material property distribution on the thickness of the blank;

Test the structure of the final forged blank, and analyze the microstructure of the forged material by metallurgical microscope and electron microscope, including particle diameter, grain size, grain orientation, etc.;

Test the material properties of the final forging blank, and use a tensile testing machine and a hardness tester to test the material properties of the forged material, including tensile strength, yield strength, elongation, hardness, etc.;

As shown in FIG. 3, the final forging blank exhibits three different structure and material mechanical properties distributions in thickness, from bottom to top, they are the bottom layer L1, the middle layer L2, and the top layer L3. Among them, the L1 layer has the best microstructure and mechanical properties, with the yield strength of 185 MPa, the tensile strength of 280 MPa, and the elongation of 12%. The L2 layer has medium structure and mechanical properties, with the yield strength of 170 MPa, the tensile strength reaching 265 MPa, and the elongation of 13%. The L3 layer has the worst structure and mechanical properties, with the yield strength of 155 MPa, a tensile strength of 260 MPa, and an elongation of 15%.

Step 5, according to the layered material property distribution on the thickness of the blank obtained in step 4, which is different from the required performance by the design requirements of magnesium alloy wheels, magnesium alloy wheels with different material properties that meet the requirements of use are obtained through design and machining.

Figure 8:
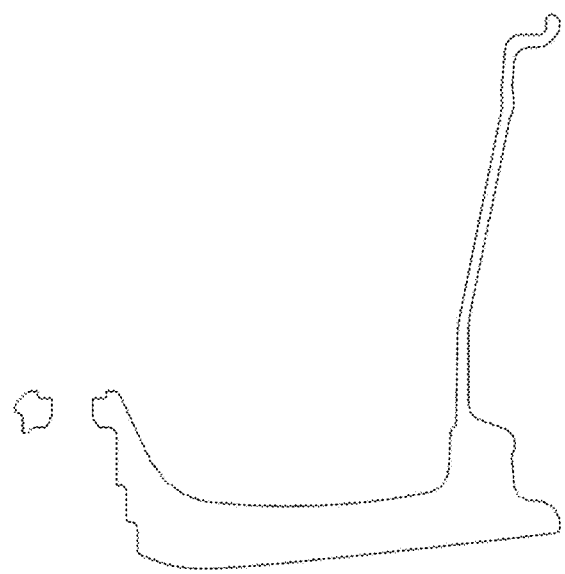
FIG. 8 is a cross-sectional view of a hub of a method of producing a magnesium alloy hub according to the present disclosure.
Figure 9:
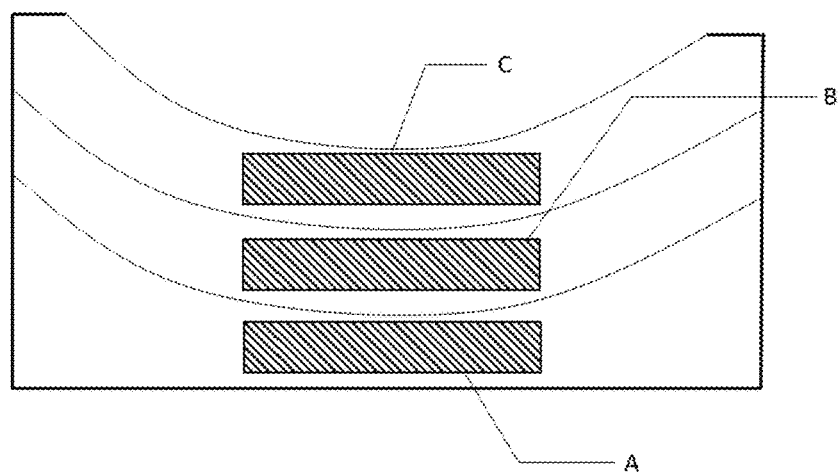
FIG. 9 is the first schematic diagram of the spoke orientation of the hub of the method of producing a magnesium alloy hub according to the present disclosure.
Figure 10:
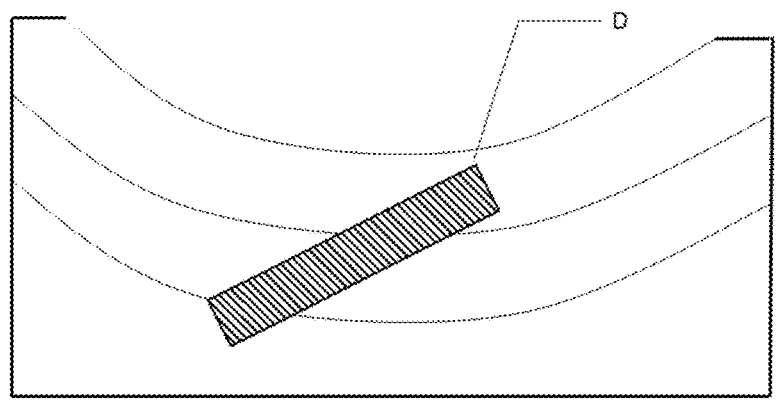
FIG. 10 is the second schematic diagram of the spoke orientation of the hub of the method of producing a magnesium alloy hub of the present disclosure.

As shown in FIG. 8-10, the lower part of the hub as shown in FIG. 8 is the spokes. FIGS. 9 and 10 indicate the design and processing positions of the spokes of the four magnesium alloy hubs: spoke processing orientation of the wheel hub A, spoke processing orientation of the wheel hub B, spoke processing orientation of the wheel hub C, spoke processing orientation of the wheel hub D.

Embodiment 1

Figure 1:
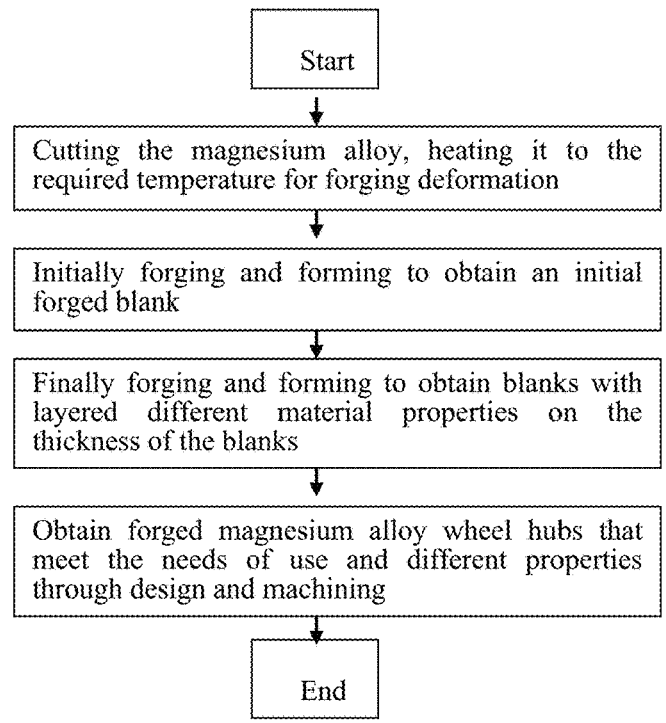
FIG. 1 is a flow chart of the method of producing a magnesium alloy wheel hub of the present disclosure.

As shown in FIG. 1, an embodiment of the present disclosure provides a method for producing a magnesium alloy wheel hub, which comprises:

Step 1, cutting the magnesium alloy bar, heating it to the required temperature for forging deformation.

In the process of cutting the magnesium alloy bar, the most suitable and economical bar length is selected by calculating the material length and material ratio of each magnesium alloy wheel hub in advance, and the bar is cut by a metal cutting machine; in the process of heating the alloy bar to the required temperature for forging deformation, heating the magnesium alloy bar in a heating furnace to a certain temperature and keeping it for a period of time, wherein the heating furnace may be an electromagnetic heating furnace, etc.; the preset temperature is greater than or equal to 360° C., but it is not allowed to exceed 430° C.; 400° C. is the temperature for magnesium alloy easiest to deform and not easy to break, which ensures that there will be no cracking in the subsequent forging process.

Figure 2:
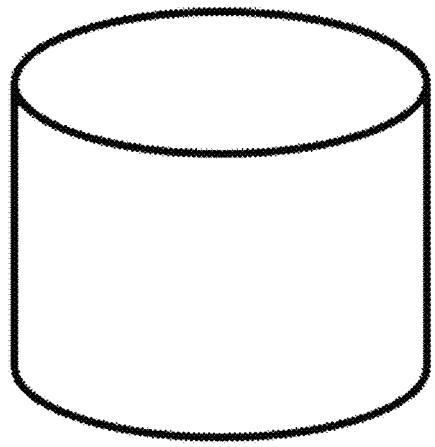
FIG. 2 is a schematic diagram of a bar of the method of producing a magnesium alloy wheel hub according to the present disclosure.

Step 2, initially forging and forming to obtain an initial forged blank. The blank shown in FIG. 2 is forged and formed, and the forging speed is controlled at 6-15 mm/s. The purpose of initial forging is to locate and ensure that the bar does not crack during the forging process.

Step 3, finally forging and forming to obtain blanks with layered different material properties on the thickness of the blanks, as shown in FIG. 3.

The final forging blank can show different structures and different mechanical properties of materials in the thickness direction, as shown in FIG. 3; from the figure, it can be observed that the structure of the bottom layer has fine and uniform grains, showing a completely recrystallized structure, with the yield strength of 185 MPa, the tensile strength of 280 MPa, and the elongation of 12%; the structure of the middle layer has fine grains, some of the grains has grown, showing an incomplete recrystallized structure, with the yield strength of 170 MPa, the tensile strength of 265 MPa, and the elongation of 13%, the structure of the upper layer has fine grains, but it is not uniform, and the degree of recrystallized structure is lower than that of the middle layer. The yield strength reaches 155 MPa, the tensile strength reaches 260 MPa, and the elongation rate reaches 15%.

Step 4, obtain forged magnesium alloy wheel hubs that meet the needs of use and different material properties through design and machining; the design and machining methods of magnesium alloy wheel hubs fully consider the difference in the layered mechanical properties of the final forged blank, and track the different material properties of different layers, when selecting the design and machine processing of the spokes, different processing directions of the spokes can be selected according to the needs, to obtain magnesium alloy wheel hubs with different properties, to obtain magnesium alloy wheel hubs with different weights, and to achieve the purpose of weight reduction, the premise is to ensure the hub's use performance.

In this embodiment, four types of magnesium alloy wheels are designed and processed, which are respectively defined as wheel hub A, wheel hub B, wheel hub C, and wheel hub D. The cross-sectional view of the magnesium alloy wheel hub is shown in FIG. 8. The design and processing orientation of the wheel hub A is that the spoke direction is along the direction of the L1 layer, and the processing area is included in the L1 layer, as shown in FIG. 9; the design and processing orientation of the wheel hub B is that the spoke direction is along the direction of the L2 layer, and the processing area is included in the L2 layer, as shown in FIG. 9; the design and processing orientation of the wheel hub C is that the spoke direction is along the direction of the L3 layer, and the processing area is included in the L3 layer, as shown in FIG. 9; the design and processing orientation of the wheel hub D is that the spoke direction is from the L1 layer to the L3 layer, and the processing area runs through the L1, L2, and L3 layers, as shown in FIG. 10;

Various performance tests are carried out on the four types of magnesium alloy motor wheel hubs of embodiment 1. In the test center of CITIC Dicastal Co., Ltd., the above wheels are subjected to 13-degree impact strength, radial fatigue, bending fatigue and other wheel strength and fatigue tests. Tests show that the hub meets the American wheel standards (SAE J175 and SAE J328-2005), that is, 13-degree impact strength, radial fatigue, and bending fatigue performance requirements. It can also meet requirements of the wheel strength and fatigue of the national standards (GB/T 5334-2005 and GB/T 15704-1995).

In addition, the 13-degree impact limit test is respectively performed on wheel hub A, wheel hub B, wheel hub C, and wheel hub D in accordance with the requirements of the national standard, and impacting continues until cracking. The results show that the impact limit performance of wheel hub A is 840 Kg, and the impact limit performance of wheel hub B is 810 Kg, the impact limit performance of the wheel hub C is 785 Kg, the impact limit performance of the wheel hub D is 755 Kg, the impact resistance indicates wheel hub A>wheel hub B>wheel hub C>wheel hub D, which is consistent with the spoke processing order and performance orientation of the magnesium alloy hub. The microstructure and material properties of the wheel hub D is not uniform, resulting in the worst performance. From this, it can be inferred that if the same usage requirements are met, the weight reduction space of the A hub is larger than that of the B hub, the C hub and the D hub, the weight reduction space of the B hub is larger than that of the C hub, and the weight reduction space of the C hub is larger than that of the D hub.

The method of producing the magnesium alloy wheel hub of the present disclosure has the following advantages:

The disclosure heats the magnesium alloy bar to a preset temperature, the magnesium alloy bar is more easily deformed and is not easy to produce forging cracks; the blank obtained by the forging process through the initial forging and the final forging can obtain different structures and different material mechanical properties in thickness; according to the different properties of the blank, the spoke orientation of the magnesium alloy wheel can be quickly designed according to the needs, and the magnesium alloy wheel that meets the performance can be obtained, which greatly improves the design and processing efficiency.

In addition, the designed and processed wheel hub still has excellent mechanical properties, meeting the American wheel standards (SAE J175 and SAE J328-2005), that is, 13-degree impact strength, radial fatigue, and bending fatigue performance requirements. It can also meet requirements of the wheel strength and fatigue of the national standards (GB/T 5334-2005 and GB/T 15704-1995).

The above are only the preferred embodiments of the present disclosure and are not intended to limit the present disclosure. Any modification, equivalent replacement, improvement, etc. made within the spirit and principle of the present disclosure shall be included within the protection scope of the present disclosure.

What is claimed is:

1. A method of producing a magnesium alloy wheel hub, wherein the method comprises the following steps:
    Step 1, heating a magnesium alloy bar to a temperature in a range of 350-430° C. for 20 minutes;
    Step 2, initially forging the bar under a forging press at a forging speed of 6-15 mm/s;
    Step 3, finally forging the bar under the forging press at a forging speed of 5-8 mm/s;
    Step 4, performing microstructure test and material property test on a final forged blank to obtain layered material property distribution in a thickness direction of the final forged blank;
    step 5, according to the layered material property distribution in the thickness direction of the final forged blank obtained in step 4, selecting a part of the final forged blank in the thickness direction that meets requirements to make a magnesium alloy wheel hub, and making the magnesium alloy wheel hub with the selected part by machining and cutting off a part of the final forged blank in the thickness direction that does not meet the requirements.

2. The method for producing a magnesium alloy wheel hub according to claim 1, wherein before step 1, the magnesium alloy bar is first cut into a certain length by a cutting machine.

3. The method for producing a magnesium alloy wheel hub according to claim 1, wherein in step 1, the step of heating the magnesium alloy bar comprises heating the magnesium alloy bar by a heating furnace.

4. The method for producing a magnesium alloy wheel hub according to claim 3, wherein the heating furnace comprises an electromagnetic heating furnace.

5. The method for producing a magnesium alloy wheel hub according to claim 1, wherein the temperature in step 1 is 360-420° C.

6. The method for producing a magnesium alloy wheel hub according to claim 5, wherein the temperature in step 1 is 400° C.

7. The method for producing a magnesium alloy wheel hub according to claim 1, wherein the forging press comprises a 6000-ton forging press.

8. The method for producing a magnesium alloy wheel hub according to claim 1, wherein the microstructure test on the final forged blank in step 4 comprises analyzing microstructure of the final forged blank using a metallurgical microscope and an electron microscope.

9. The method for producing a magnesium alloy wheel hub according to claim 1, wherein the material property test on the final forged blank in step 4 comprises using a tensile testing machine and a hardness tester to analyze material performance of the final forged blank.

\* \* \* \* \*